US009914450B2

(12) United States Patent
Ahn et al.

(10) Patent No.: US 9,914,450 B2
(45) Date of Patent: Mar. 13, 2018

(54) APPARATUS AND METHOD FOR LEARNING ENGINE FRICTION TORQUE OF HYBRID VEHICLE

(71) Applicants: Hyundai Motor Company, Seoul (KR); Kia Motors Corporation, Seoul (KR)

(72) Inventors: Hyun Mo Ahn, Seoul (KR); Yun Chan Heo, Seoul (KR); In Tak Kim, Gyeonggi-do (KR); Doo Il Won, Seoul (KR); Hae Seung Lee, Gyeonggi-do (KR); Yeong Jin Nam, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 40 days.

(21) Appl. No.: 14/960,367

(22) Filed: Dec. 5, 2015

(65) Prior Publication Data

US 2016/0297421 A1 Oct. 13, 2016

(30) Foreign Application Priority Data

Apr. 9, 2015 (KR) .......................... 10-2015-0050042

(51) Int. Cl.
*B60W 20/13* (2016.01)
*B60W 20/00* (2016.01)
(Continued)

(52) U.S. Cl.
CPC ............. *B60W 20/50* (2013.01); *B60K 6/48* (2013.01); *B60K 2006/268* (2013.01); *B60W 2710/0627* (2013.01); *B60W 2710/0644* (2013.01); *B60Y 2200/92* (2013.01); *B60Y 2300/63* (2013.01); *B60Y 2400/60* (2013.01); *Y02T 10/6221* (2013.01); *Y02T 10/6269* (2013.01); *Y10S 903/903* (2013.01)

(58) Field of Classification Search
None
See application file for complete search history.

(56) References Cited

U.S. PATENT DOCUMENTS 6,029,109 A * 2/2000 Rossignol ................. G01L 3/00
701/110
6,042,505 A * 3/2000 Bellinger ............... B60W 10/06
477/111

(Continued)

FOREIGN PATENT DOCUMENTS

JP 2001-295683 10/2001
JP 2003-083143 A 3/2003
(Continued)

*Primary Examiner* — Navid Ziaeianmehdizadeh
(74) *Attorney, Agent, or Firm* — Mintz Levin Cohn Ferris Glovsky and Popeo, P.C.; Peter F. Corless

(57) ABSTRACT

The present disclosure provides a technology of determining an engine friction torque even when idling of an engine is not performed, by providing a certain engine Revolutions per Minute (RPM) in stop state of the engine using Hybrid Starter & Generator (HSG) connected to an engine pulley. The present disclosure provides a technology of determining an accurate engine friction torque using a torque provided from the outside of an engine instead of a torque generated the engine itself.

8 Claims, 4 Drawing Sheets

(51) Int. Cl.
   *B60K 6/26*   (2007.10)
   *B60W 20/50*  (2016.01)
   *B60K 6/48*   (2007.10)

(56) References Cited

U.S. PATENT DOCUMENTS

| | | | | |
|---|---|---|---|---|
| 6,188,951 B1* | 2/2001 | Beechie | ............ | G01M 15/042 |
| | | | | 701/102 |
| 6,490,511 B1* | 12/2002 | Raftari | ............ | B60W 20/11 |
| | | | | 180/65.1 |
| 6,845,305 B1* | 1/2005 | Raftari | ............ | B60K 6/445 |
| | | | | 477/2 |
| 6,866,024 B2* | 3/2005 | Rizzoni | ............ | F02D 35/024 |
| | | | | 123/406.22 |
| 7,031,820 B2* | 4/2006 | Ueda | ............ | F02D 37/02 |
| | | | | 701/101 |
| 7,054,738 B1* | 5/2006 | Stotsky | ............ | F02D 41/062 |
| | | | | 123/339.19 |
| 7,324,888 B1* | 1/2008 | Stotsky | ............ | F02D 41/123 |
| | | | | 701/101 |
| 7,873,463 B2* | 1/2011 | Zell | ............ | F02D 41/1402 |
| | | | | 123/339.16 |
| 7,958,779 B2* | 6/2011 | Nagano | ............ | F02D 41/0097 |
| | | | | 73/114.15 |
| 8,798,889 B2* | 8/2014 | Fujii | ............ | F16H 59/16 |
| | | | | 280/734 |
| 9,592,824 B1* | 3/2017 | Kim | ............ | B60K 6/387 |
| 2009/0171538 A1* | 7/2009 | Kadota | ............ | B60K 6/485 |
| | | | | 701/51 |
| 2009/0229897 A1* | 9/2009 | Yutani | ............ | B60W 20/15 |
| | | | | 180/65.28 |
| 2011/0054744 A1* | 3/2011 | Brennan | ............ | F02D 35/023 |
| | | | | 701/51 |
| 2013/0138280 A1* | 5/2013 | Kim | ............ | B60W 10/30 |
| | | | | 701/22 |
| 2014/0155222 A1* | 6/2014 | Kim | ............ | B60K 6/442 |
| | | | | 477/5 |
| 2015/0183424 A1* | 7/2015 | Kim | ............ | B60W 20/40 |
| | | | | 701/22 |
| 2015/0344021 A1* | 12/2015 | Kim | ............ | B60W 10/06 |
| | | | | 701/22 |
| 2016/0059848 A1* | 3/2016 | Kim | ............ | B60W 20/40 |
| | | | | 701/22 |
| 2016/0082942 A1* | 3/2016 | Park | ............ | B60W 20/00 |
| | | | | 701/22 |

FOREIGN PATENT DOCUMENTS

| | | |
|---|---|---|
| JP | 2009-41421 | 2/2009 |
| JP | 2009-248586 | 10/2009 |
| JP | 5229035 | 10/2010 |
| JP | 2013-67298 | 4/2013 |
| KR | 10-2013-0088206 | 8/2013 |
| KR | 10-2013-0132315 | 12/2013 |

* cited by examiner

APPARATUS AND METHOD FOR LEARNING ENGINE FRICTION TORQUE OF HYBRID VEHICLE

CROSS-REFERENCE TO RELATED APPLICATION

This application claims under 35 U.S.C. § 119(a) the benefit of and priority to Korean Patent Application No. 10-2015-0050042 filed Apr. 9, 2015, the entire contents of which are incorporated herein by reference.

BACKGROUND (a) Technical Field

The present disclosure relates generally to an apparatus and method for learning an engine friction torque of a hybrid vehicle. More particularly, the present disclosure relates to an apparatus and method for learning and storing an engine friction torque upon engine startup when an engine is driven through a Hybrid Starter & Generator (HSG), and an Engine Push with Fuel Cut Off (PUC) diagnosis is performed in a hybrid vehicle.

(b) Background Art

Hybrid vehicles are next generation vehicles which improve the fuel efficiency of a vehicle and significantly reduces the emission of harmful gases. Hybrid vehicles include both an internal combustion engine and an electric motor and perform driving of the internal combustion engine or of the electric motor in accordance with the operating conditions of a vehicle.

Furthermore, plug-in hybrid vehicles have been mass-produced recently. The plug-in hybrid vehicle plugs into an electrical outlet to charge its battery and runs by driving a motor with the charged battery. Since the plug-in hybrid vehicle is driven by an oil engine when the charge amount of the battery drops to a certain level or less, the plug-in hybrid vehicle has higher fuel efficiency than general hybrid vehicles.

The hybrid vehicle and the plug-in hybrid vehicle include an engine and a plurality of motors and may further include a Hybrid Starter & Generator (HSG) directly connected to the engine. Accordingly, the hybrid vehicle and the plug-in hybrid vehicle can drive the engine through the HSG without a combustion process of an internal combustion engine.

Thus, since the HSG equipped in the hybrid vehicle or the plug-in hybrid vehicle is configured to be connected to an engine pulley, the engine may be forcibly revolved through the driving of the HSG. Furthermore, the HSG connected to the battery serves to convert a torque generated in the engine into battery charging energy.

Since the hybrid vehicle and the plug-in hybrid vehicle include an engine system as a component generating a driving force, it is necessary to determine a drag torque of a drive engine or loss torques of auxiliary units, which are determined by the internal friction of the drive engine in order to operate the engine system. Typically, this is performed using characteristics curves or characteristic maps which determine the drag torque or the loss torque, e.g., in accordance with the operating point or in accordance with state variables of the drive engine. In order to compensate for deviations of loss torques provided in the characteristics curves or the characteristic maps, shown by part tolerances due to the manufacturing reasons or for the durability life of the engine system, generally, these deviations are permanently, continuously, or regularly applied.

The internal combustion engine for applying the loss torque requires very limited operating conditions. In case of existing gasoline vehicles, the idle state of the engine is required to compensate for the torque deviation of the engines However, since the idle state is minimized to improve the fuel efficiency in the hybrid vehicle and the plug-in hybrid vehicle, there is a difficulty in performing typical engine friction torque learning.

FIG. 1 is a view illustrating engine torque Proportional Integral Derivative (PID) control for setting a target engine RPM when there is no external change in an idle state of an engine according to a related art. As shown in FIG. 1, when the target engine RPM is maintained, the integral control for a torque generated in the engine is performed.

In another related art, Korean Patent Application Publication No. 10-2013-0088206 (hereinafter, referred to as Reference 1) discloses an apparatus and method of learning engine torque, which stores engine torque execution completion data and learning values about engine torques obtained by learning engine torques in idle mode when there exist engine torque learning execution completion data and engine torque learning values in idle state. However, in Reference 1, the apparatus performs PID control through idling of an engine, and there is a limitation in learning an engine friction torque in a hybrid vehicle and a plug-in hybrid vehicle which minimize the engine idle state. Furthermore, since learning is performed through the driving of the engine during the stop of a vehicle, there is a limitation in that it is difficult to perform accurate engine friction torque learning.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure provides a technology of learning an engine friction torque even when idling of an engine is not performed, by providing a certain engine RPM in stop state of the engine using Hybrid Starter & Generator (HSG) connected to an engine pulley. The present disclosure also uses a hybrid starter generator (HSG) providing an accurate torque, and thus provides a technology of learning a more accurate engine friction torque using a torque provided from the outside of an engine instead of a torque generated in the engine itself.

The objects of the present disclosure are not limited to the above. Other objects which are not mentioned will be understood by the following description, and will be more clearly understood by the embodiments of the present disclosure. Also, the objects of the present disclosure can be achieved by units and methods described in Claims and combinations thereof.

According to embodiments of the present disclosure, an apparatus for determining engine friction torques of a hybrid vehicle, includes: an engine providing a driving force of the hybrid vehicle; a Hybrid Starter & Generator (HSG) connected to the engine and generating a torque so as to forcibly drive the engine; and a controller controlling the torque generated in the HSG and determining friction information of the engine in accordance with the applied torque, wherein the controller is configured to operate as: an engine condition determination module determining a Engine Push with Fuel Cut Off (PUC) diagnosis condition of an idling or stop state of the engine and a driving-enabled state of the HSG;

a torque control module controlling the torque generated by the HSG such that an engine Revolutions per Minute (RPM) is uniformly maintained when the PUC diagnosis condition is satisfied; and a learning module performing a PUC diagnosis through the torque generated by the HSG and determining information about the engine friction torques.

The learning module may determine an amount of the engine friction torques according to the performance of the PUC diagnosis, when the engine condition determination module determines that the PUC diagnosis conditions are satisfied.

The learning module may determine a PUC diagnosis stabilization condition when a predetermined time elapses after the PUC diagnosis, and the learning module determines that the PUC diagnosis stabilization condition is satisfied when a change of the engine RPM is equal to or less than a predetermined reference value.

The learning module may compare the torque generated by the HSG to a moving mean value of the engine friction torques and store the engine friction torques.

Furthermore, according to embodiments of the present disclosure, a method for determining engine friction torques of a hybrid vehicle includes: determining, by an engine condition determination module of a controller, a PUC diagnosis condition of an idling or stop state of an engine of the hybrid vehicle and a driving-enabled state of an HSG connected to the engine that generates a torque so as to forcibly drive the engine; controlling, by a torque control module of the controller, the torque generated by the HSG such that an engine RPM is uniformly maintained when the PUC diagnosis condition is satisfied; performing, by a learning module of the controller, a PUC diagnosis through the torque generated by the HSG; determining, by a learning module of the controller, a PUC diagnosis stabilization condition when the engine RPM is uniformly maintained through the controlling of the amount of torque of the HSG; comparing, by the learning module of the controller, the torque generated by the HSG to the engine friction torques when the PUC diagnosis stabilization condition is satisfied; and storing, by the learning module of the controller, the engine friction torques.

The determining of the PUC diagnosis condition may include determining whether the HSG is in the driving-enabled state when the engine is in the stop or idling state.

The determining of the PUC diagnosis stabilization condition may include determining the PUC diagnosis stabilization condition when a predetermined time elapses after the PUC diagnosis, and determining that the PUC diagnosis stabilization condition is satisfied when a change of the engine RPM is equal to or less than a predetermined reference value.

The comparing may include comparing the torque generated by the HSG to a moving mean value of the engine friction torques.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

Figure 1:
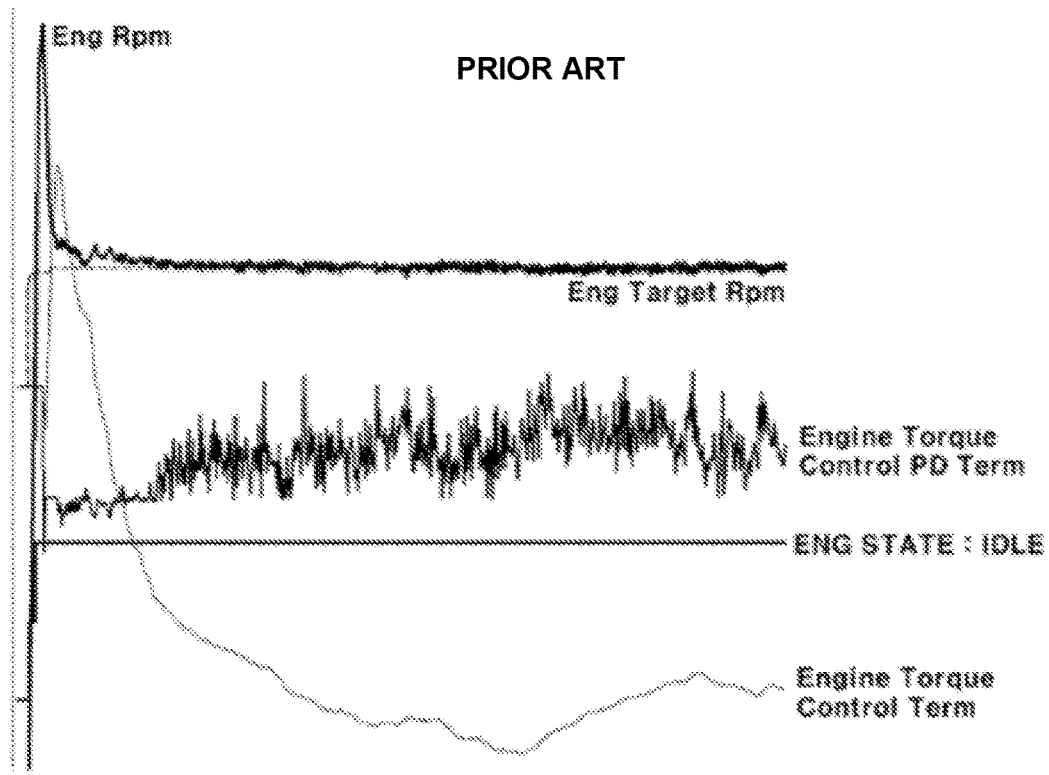
FIG. 1 is a graph illustrating Proportional Integral Derivative (PID) control for learning an engine friction torque in a related art.

Reference numerals set forth in the Drawings includes reference to the following elements as further discussed below:

10: engine
20: hybrid starter & generator (HSG)
30: controller
31: torque control module
32: engine condition determination module
33: learning module It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

The present disclosure relates to an apparatus and method for learning an engine friction torque of a hybrid vehicle, which enables learning of accurate engine friction torques for maintaining a target engine Revolutions per Minute (RPM) by providing a torque according to a target RPM of an engine through a Hybrid Starter & Generator (HSG). That is, since the present disclosure does not require idling of an engine, accurate engine friction torque learning can be achieved even in an engine stop state through a torque provided by the HSG connected to the engine. That is, the diagnosis of an oxygen sensor may be performed in a Engine Push with Fuel Cut Off (PUC) diagnosis, the air-fuel ratio of the oxygen sensor may be measured and simultaneously, a torque may be provided to an engine based on the HSG, thereby providing a technology of performing engine friction torque learning.

FIG. 1 shows exemplary data of an engine friction torque learning apparatus requiring idling of an engine in a related art. As shown in the graph, in the case of a technology of learning an engine friction torque through engine idling in a related art, engine friction torque learning cannot be performed through a driving force of the HSG during the engine stop. That is, a predetermined RPM of an engine cylinder is set in a controller, and the controller performs engine control through Proportional Integral Derivative (PID) control so as to maintain the predetermined RPM of the engine and thus performs engine friction torque learning. The engine friction torque is stored through an integral accumulation value factor (i.e., I-factor) received by the controller. In other words, the engine needs to be driven for learning the friction torque of the engine, which acts as a factor that lowers fuel efficiency of a hybrid vehicle. Furthermore, since a component for generating a torque through engine combustion is included, there is a limitation in calculating an accurate engine friction torque.

Figure 2:
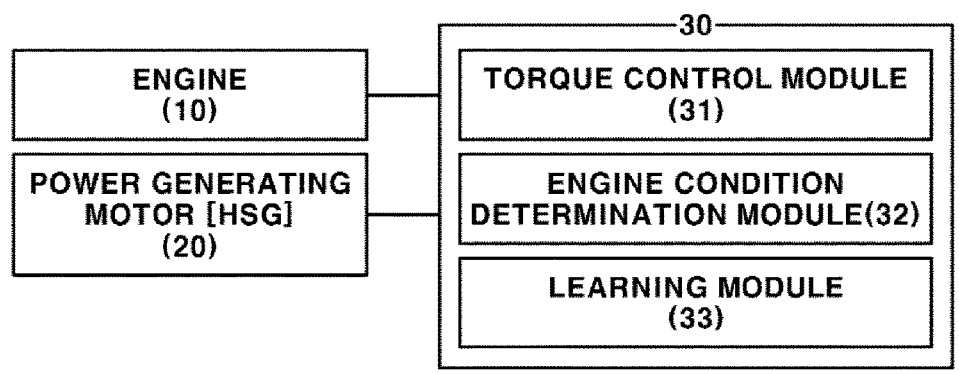
FIG. 2 is a view illustrating an apparatus for learning an engine friction torque of a hybrid vehicle according to embodiments of the present disclosure.

FIG. 2 is a view illustrating an apparatus for learning an engine friction torque of a hybrid vehicle according to embodiments of the present disclosure.

A hybrid vehicle may include an engine, and the engine may include a component connected to a HSG (e.g., power generating motor) connected to a battery. The pulley of the engine may be connected to the pulley of the HSG through a belt and may rotate the pulley of the HSG by a driving force of the engine while a vehicle is running by consuming fuel, thereby charging the battery.

On the contrary, when a current is applied to the HSG during the engine stop state, the HSG may rotate the pulley of the engine to start the engine. Also, the hybrid vehicle may include a controller which is connected to the engine and the HSG to control a torque applied to the engine and the HSG and to determine an engine friction torque by calculating a torque applied to maintain a uniform RPM of the engine. The controller may be configured to operate as an engine condition determination module for determining whether or not conditions for performing engine friction learning are satisfied, a torque control module for applying a uniform torque to the engine through the HSG, and a learning module for calculating and storing an engine friction torque through a torque provided from the HSG.

The engine condition determination module may check an engine-friction-torque-learning-enabled state and may determine the idle and stop states of the engine. Also, the engine condition determination module may serve to check whether or not the HSG can be driven.

The learning module may perform a PUC diagnosis. In the PUC diagnosis, the HSG may recognize a rotating torque of the engine such that the engine RPM is maintained at a certain level while fuel supply is blocked and may measure a difference from the engine friction torque generated in the engine. Also, the learning module may determine and store the mean value of the measured engine friction torques. That is, the learning module may maintain a predetermined engine RPM provided from the HSG and may serve to determine and store an engine friction torque. Also, the learning module may determine PUC diagnosis stabilization when a predetermined time elapses after the completion of the PUC diagnosis. The PUC diagnosis stabilization may include determining whether or not the engine RPM is equal to or less than a reference value when a predetermined time elapses after the completion of the PUC diagnosis. In addition, when the PUC diagnosis stabilization is satisfied, the learning module may compare and determine a moving mean value of the engine friction torques, and may store the determined engine friction torques such that the torques are accessible by the controller.

Figure 3:
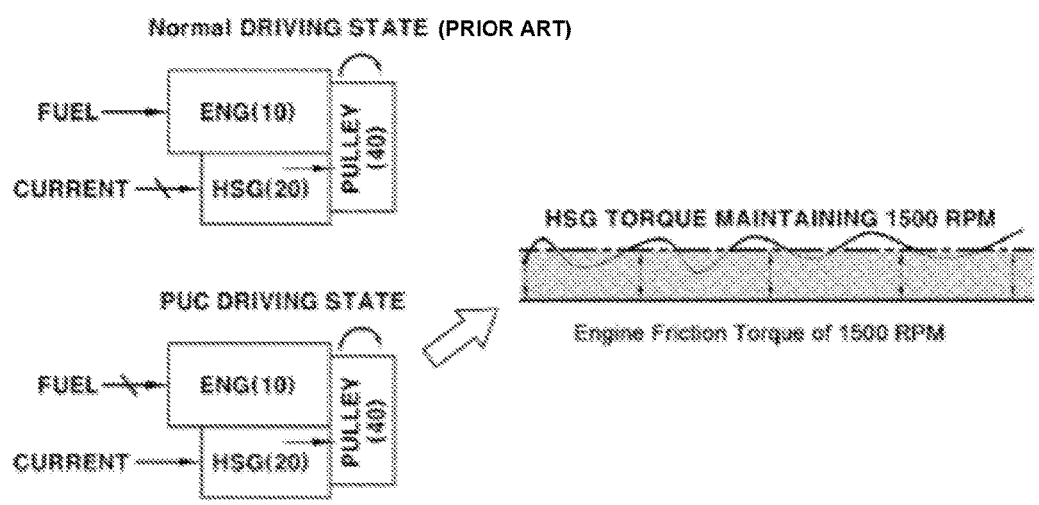
FIG. 3 is a view illustrating an engine driving of a PUC state, which shows a driving state maintaining a uniform engine RPM.

FIG. 3 shows a general driving state in which the pulley of the HSG is rotated by the engine driving force during the fuel consumption running process, and a PUC driving state in which the pulley of the engine is rotated through the HSG to operate the engine.

As shown in FIG. 3, a predetermined engine RPM may be applied in the PUC driving state, and a current may be applied to the HSG when fuel supply to the engine is blocked. More preferably, a uniform current may be applied to the HSG to rotate the pulley connected to the engine through a belt when the engine is stopped, and thus a uniform torque may be applied to the engine. Alternatively, the HSG may be controlled such that the engine RPM is maintained at about 1,500 rpm, and a torque may be provided through the torque control module of the controller.

Figure 4:
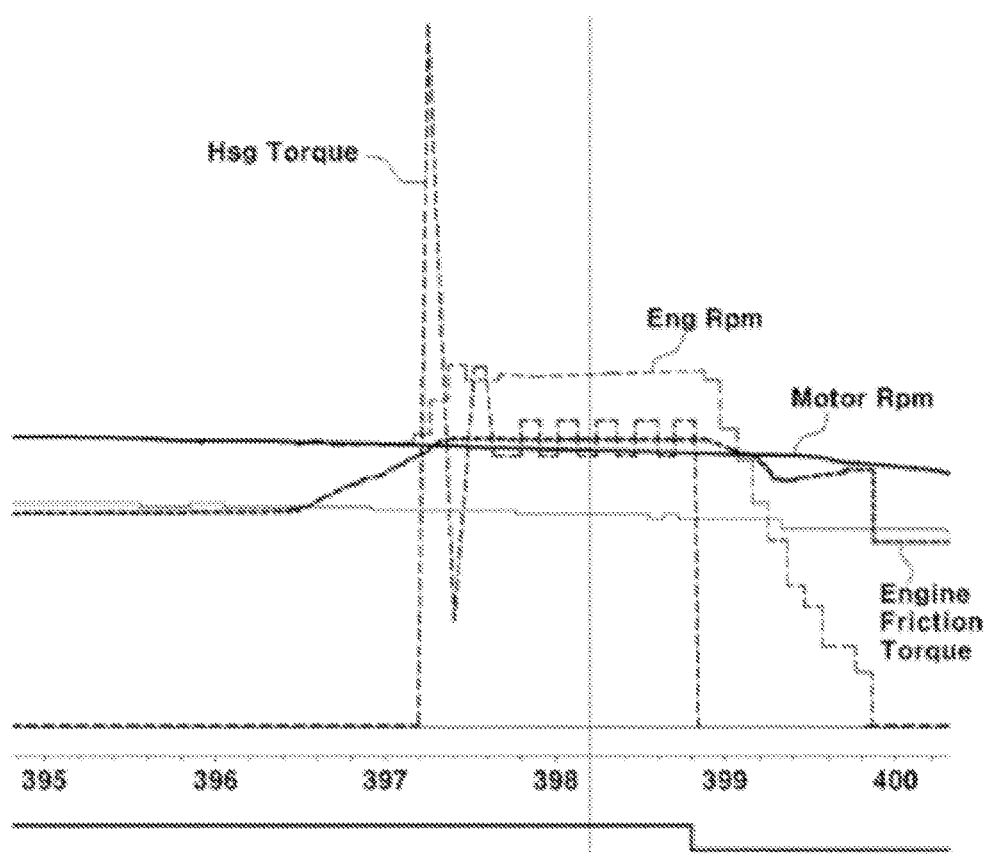
FIG. 4 is a view torque and RMP data generated in an engine and a HSG in a PUC state according to embodiments of the present disclosure.

FIG. 4 shows data controlled such that the engine RPM is uniformly maintained by the torque provided by the HSG according to embodiments of the present disclosure.

The data may include a section in which the engine RPM increases and is maintained at a uniform value during the hybrid mode driving state in which a motor is maintained at a certain RPM or more. In this case, a torque may be applied to the HSG to forcibly rotate the engine pulley and thus drive the engine. Thus, even in the engine stop state, a torque generated in the HSG may be applied to the engine, and the engine RPM may be controlled to be maintained at RPM preset in the controller.

In the case of the engine driven as above, the engine friction torque may be measured and calculated from the amount of torque applied from the HSG. More preferably, the engine friction torque may be determined by comparing the moving mean value of the engine friction torques based on the torque applied in accordance with the torque control module of the controller. That is, the learning module may calculate a required torque of the HSG provided to maintain the engine RPM predetermined in the controller and may determine an engine friction torque for driving the engine through the required torque provided to maintain the engine RPM.

Figure 5:
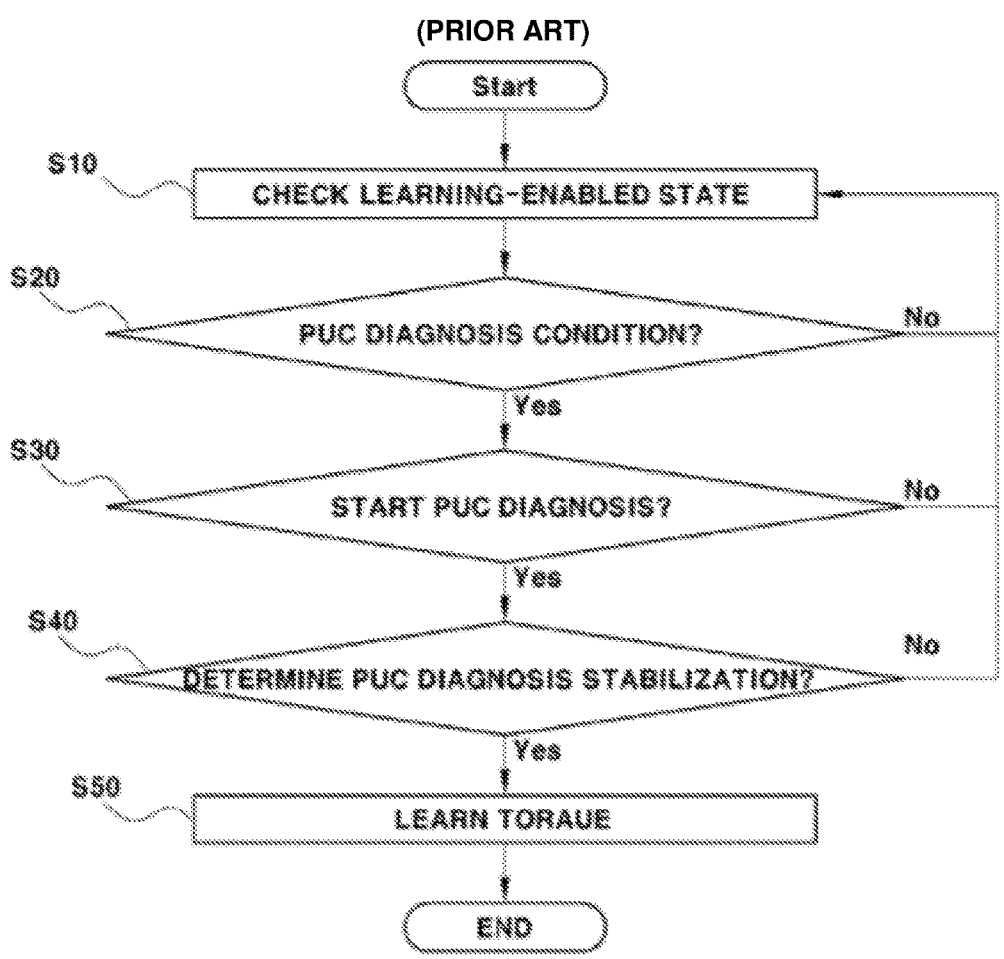
FIG. 5 is a flowchart illustrating a process of learning an engine friction torque according to embodiments of the present disclosure.

FIG. 5 is a flowchart illustrating a method of learning a hybrid engine friction torque.

As shown in FIG. 5, a process of checking an initial learning-enabled state may be performed according to embodiments of the present disclosure. That is, the engine condition determination module of the controller may determine the condition of the engine and the state of the HSG, and in this case, the idling or stop condition of the engine needs to be satisfied. In addition, the connection state of the HSG and the engine may be determined, and it may be determined whether or not the torque generation function in the HSG is normal.

Also, after the engine condition and the learning-enabled state of the HSG are checked, the engine condition determination module of the controller may determine a PUC diagnosis condition as a process prior to the PUC diagnosis. In the diagnosis, it may be determined whether or not a PUC state is formed, which is a process of preparing the application of a current to the HSG. That is, the engine condition determination module of the controller may check the learning-enabled state of the controller and the engine and may measure the driving state of the HSG.

The PUC diagnosis may be performed within a range in which a driver does not feel a sense of difference. When the deceleration intention of a driver at a certain speed is determined, the engine clutch may be minimally disengaged, minimizing the sense of difference. Thus, when the sense of difference of a driver is minimized, the PUC diagnosis learning-enabled condition may be satisfied.

When the PUC diagnosis condition is satisfied, the learning module of the controller may perform the PUC diagnosis. A current may be applied to the HSG to generate a torque. When a current is applied to the HSG, the belt connected to the pulley of the engine may rotate, and thus the engine may be forcibly driven by the rotation of the engine pulley such that the engine RPM predetermined in the controller is maintained. Consequently, the engine may be driven by a torque provided from the HSG, and the torque of the HSG may be controlled such that the predetermined engine RPM is maintained. The torque control module of the controller may calculate the amount of torque of the HSG used to maintain the engine RPM through the PUC diagnosis, and the learning module of the controller may serve to determine and store the engine friction torque through the amount of torque that is calculated.

In embodiments of the present disclosure, the learning module may compare and determine the amount of torque generated in the HSG and the moving mean value of the engine friction torques and may store the learned engine friction torques.

The foregoing PUC diagnosis may be periodically performed in accordance with an engine driving cycle. When oxygen is introduced by driving the engine through the HSG, a down oxygen sensor may perform a dilute reaction due to a large oxygen content of introduced air, and the abnormality of the oxygen sensor may be determined upon the dilute reaction. Thus, the PUC diagnosis that performs the diagnosis of the oxygen sensor may also enable the learning of an engine friction deviation. The learning module may determine the PUC diagnosis stabilization after the PUC diagnosis. After a predetermined time, when a change of the engine RPM is equal to or less than a predetermined value, it may be determined that the PUC diagnosis stabilization is satisfied.

The present disclosure allows for accurately determination of engine friction torques for maintaining a target engine RPM by generating a torque according to the target engine RPM of an engine through a Hybrid Starter & Generator (HSG). Also, since the present disclosure does not require idling of an engine, engine friction torque learning can be achieved even in an engine stop state through a torque generated by the HSG connected to the engine. Furthermore, since engine friction torque determination is enabled upon diagnosis on failure of an oxygen sensor which is necessarily performed, separate conditions and driving are not required.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for determining engine friction torques of a hybrid vehicle, comprising:
   an engine providing a driving force of the hybrid vehicle;
   a Hybrid Starter & Generator (HSG) connected to the engine and generating a torque so as to forcibly drive the engine; and
   a controller including a memory and a processor, controlling the torque generated in the HSG, and determining friction information of the engine in accordance with the applied torque,
   wherein the controller is configured to:
   determine an Engine Push with Fuel Cut Off (PUC) diagnosis condition of an idling or stop state of the engine and a driving-enabled state of the HSG, wherein the PUC diagnosis condition is satisfied when an engine clutch of the hybrid vehicle is disengaged;
   control the torque generated by the HSG such that an engine Revolutions per Minute (RPM) is uniformly maintained when the PUC diagnosis condition is satisfied;
   perform a PUC diagnosis through the torque generated by the HSG; and
   determine information about the engine friction torques.

2. The apparatus of claim 1, wherein the controller is further configured to determine an amount of the engine friction torques according to the performance of the PUC diagnosis, when the controller determines that the PUC diagnosis condition is satisfied.

3. The apparatus of claim 2, wherein the is further configured to determine a PUC diagnosis stabilization condition when a predetermined time elapses after the PUC diagnosis, and determine that the PUC diagnosis stabilization condition is satisfied when a change of the engine RPM is equal to or less than a predetermined reference value, and wherein the PUC diagnosis stabilization condition is satisfied when the engine RPM is less than or equal to a reference value when a predetermined time elapses after completion of the PUC diagnosis.

4. The apparatus of claim 1, wherein the controller is further configured to compare the torque generated by the HSG to a moving mean value of the engine friction torques and store the engine friction torques.

5. A method for determining engine friction torques of a hybrid vehicle, comprising:
- determining, by a controller, an Engine Push with Fuel Cut Off (PUC) diagnosis condition of an idling or stop state of an engine of the hybrid vehicle and a driving-enabled state of a Hybrid Starter & Generator (HSG) connected to the engine that generates a torque so as to forcibly drive the engine, wherein the PUC diagnosis condition is satisfied when an engine clutch of the hybrid vehicle is disengaged;
- controlling, by the controller, the torque generated by the HSG such that an engine Revolutions per Minute (RPM) is uniformly maintained when the PUC diagnosis condition is satisfied;
- performing, by the controller, a PUC diagnosis through the torque generated by the HSG;
- determining, by the controller, a PUC diagnosis stabilization condition when the engine RPM is uniformly maintained through the controlling of the amount of torque of the HSG, wherein the PUC diagnosis stabilization condition is satisfied when the engine RPM is less than or equal to a reference value when a predetermined time elapses after completion of the PUC diagnosis;
- comparing, by the controller, the torque generated by the HSG to the engine friction torques when the PUC diagnosis stabilization condition is satisfied; and
- storing, by the controller, the engine friction torques.

6. The method of claim 5, wherein the determining of the PUC diagnosis condition comprises:
- determining whether the HSG is in the driving-enabled state when the engine is in the stop or idling state.

7. The method of claim 5, wherein the determining of the PUC diagnosis stabilization condition comprises:
- determining the PUC diagnosis stabilization condition when a predetermined time elapses after the PUC diagnosis, and determining that the PUC diagnosis stabilization condition is satisfied when a change of the engine RPM is equal to or less than a predetermined reference value.

8. The method of claim 5, wherein the comparing comprises:
- comparing the torque generated by the HSG to a moving mean value of the engine friction torques.

* * * * *